(12) United States Patent
Satou et al.

(10) Patent No.: US 6,977,107 B1
(45) Date of Patent: Dec. 20, 2005

(54) OPTICAL RECORDING MEDIUM AND METHOD FOR MAKING THE SAME

(75) Inventors: Junichi Satou, Tokyo (JP); Mamoru Usami, Tokyo (JP); Yoshimi Sakai, Tokyo (JP); Akira Itoga, Tokyo (JP)

(73) Assignee: TDK Corporation, Tokyo (JP)

( * ) Notice: Subject to any disclaimer, the term of this patent is extended or adjusted under 35 U.S.C. 154(b) by 30 days.

(21) Appl. No.: 10/891,466

(22) Filed: Jul. 14, 2004

(51) Int. Cl.[7] .................................................. B32B 3/02
(52) U.S. Cl. ................. 428/64.1; 428/64.4; 430/270.11
(58) Field of Search ........................... 428/64.1, 64.4; 430/270.11

(56) References Cited

U.S. PATENT DOCUMENTS

| | | | | |
|---|---|---|---|---|
| 5,820,961 A | * | 10/1998 | Maruyama et al. | 428/64.1 |
| 5,840,395 A | * | 11/1998 | Sawada et al. | 428/64.1 |
| 5,972,457 A | * | 10/1999 | Matsuishi et al. | 428/64.1 |
| 6,475,588 B1 | * | 11/2002 | Schottland et al. | 428/64.1 |
| 6,538,983 B1 | * | 3/2003 | Satoh | 369/286 |
| 6,815,030 B2 | * | 11/2004 | Ishida et al. | 428/64.1 |
| 6,846,541 B1 | * | 1/2005 | Oshima | 428/64.1 |

FOREIGN PATENT DOCUMENTS

| | | |
|---|---|---|
| JP | 09-288847 | 11/1997 |
| JP | 2002-237103 | 8/2002 |

* cited by examiner

Primary Examiner—Elizabeth Mulvaney
(74) Attorney, Agent, or Firm—Young Law Firm, P.C.

(57) ABSTRACT

An optical recording medium is made by a step of bonding a light-transmissive substrate to a supporting substrate having a brightness of 8 or more and a saturation of 4 or less via a bonding layer composed of an epoxy resin; and a step of forming a transparent ink-receiving layer on a surface of the supporting substrate remote from the light-transmissive substrate. The bonding using the epoxy resin is conducted by a method of curing the resin by using a cationic initiator, a method of curing the resin by an addition reaction between the resin and a crosslinking agent containing an active hydrogen compound, a method of curing the resin by heating, or the like. In this invention, the bonding layer is composed of a material containing an epoxy resin instead of a radically polymerizable UV-curable resin typically used. Thus, although UV irradiation through the supporting substrate is not possible, the light-transmissive substrate can be securely bonded to the supporting substrate.

20 Claims, 11 Drawing Sheets

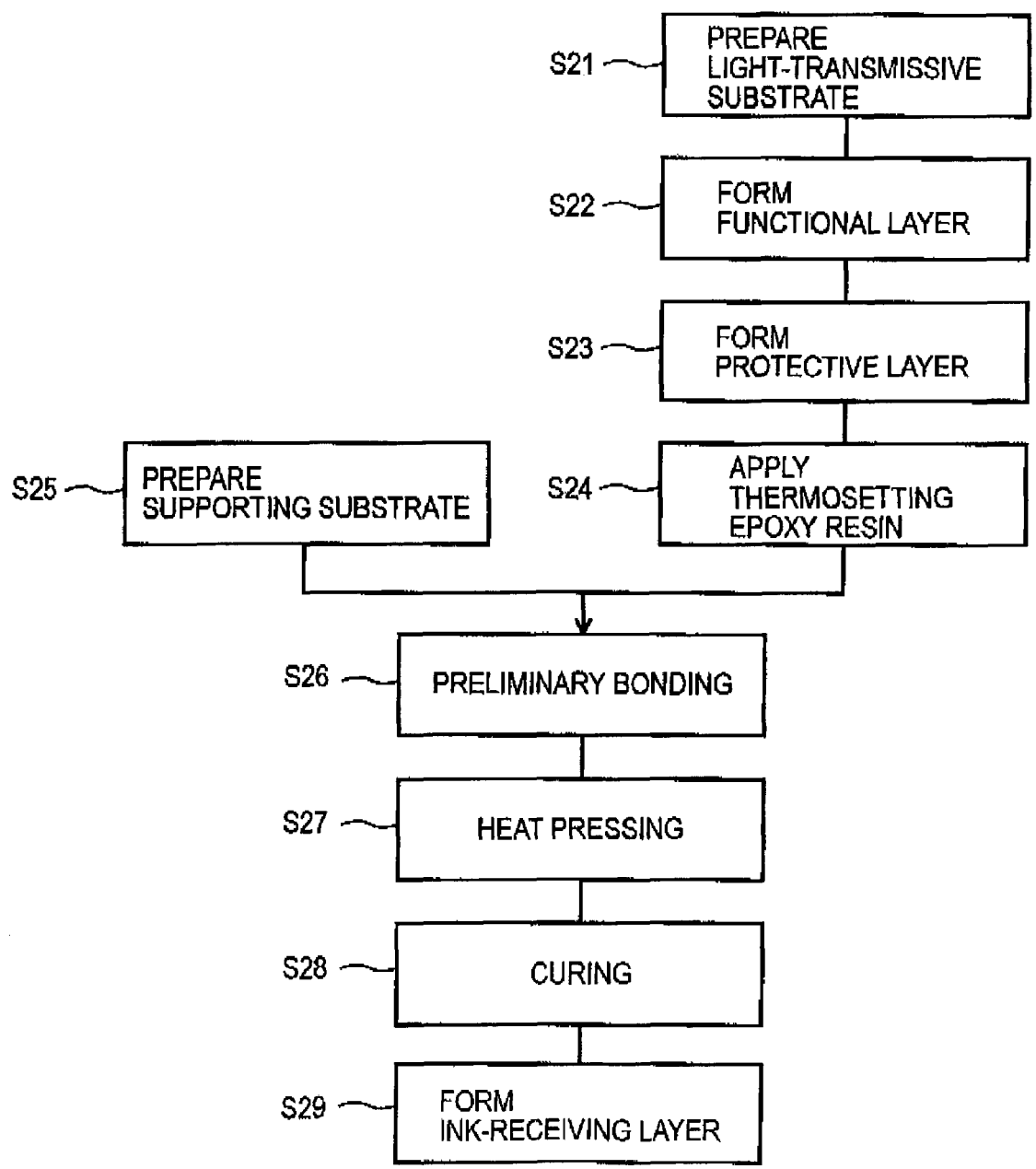

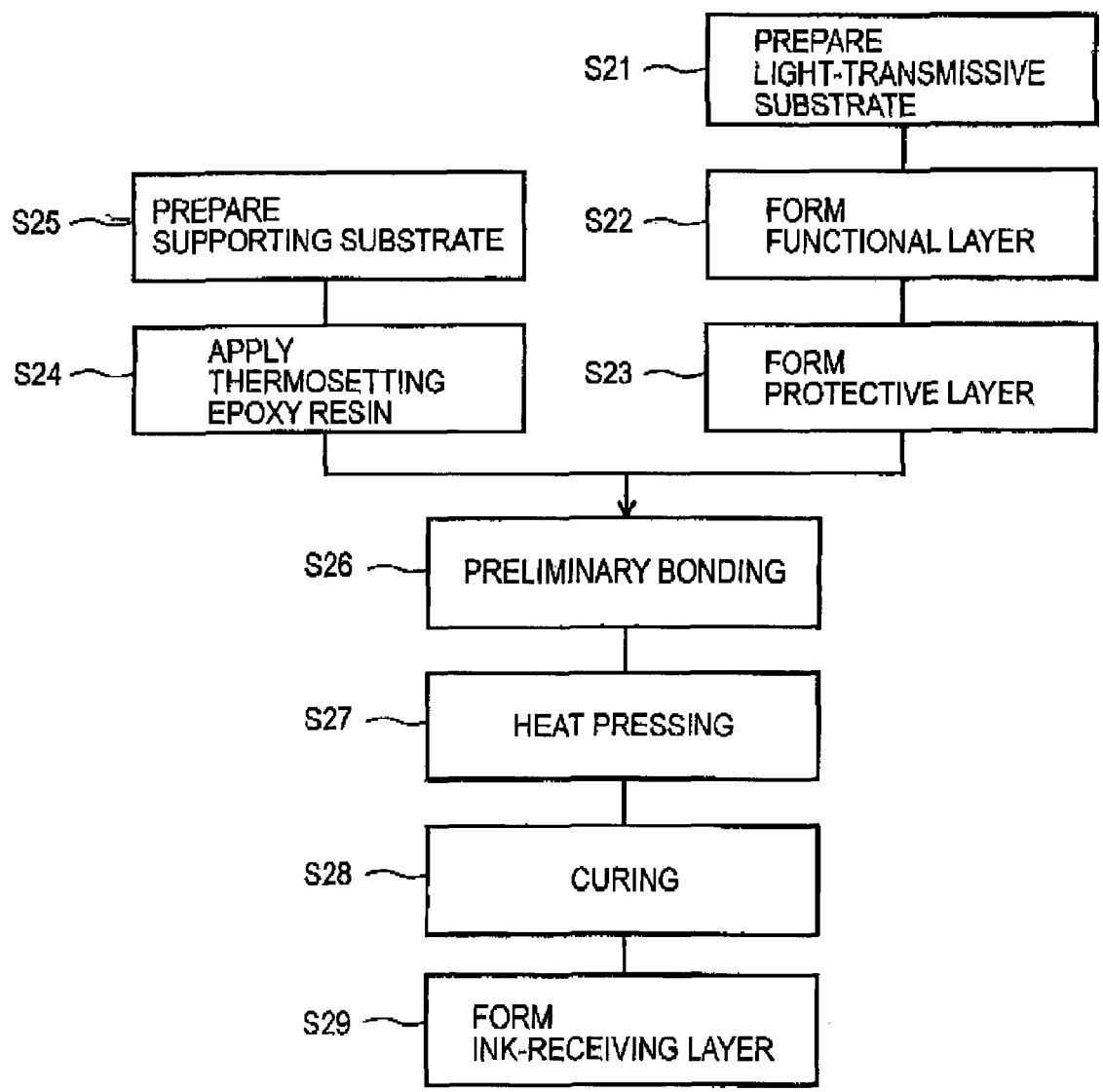

OPTICAL RECORDING MEDIUM AND METHOD FOR MAKING THE SAME

TECHNICAL FIELD

The present invention relates to optical recording media and methods for making the optical recording media. In particular, it relates to an optical recording medium having a label surface, onto which objects can be printed, at the back of a light-incident surface.

BACKGROUND ART

Recently, optical recording media, such as compact discs (CDs) and digital versatile discs (DVDs), are widely used to record large-volume digital data. In particular, optical recording media that allow users to record data thereto (recordable media) are rapidly gaining popularity, and many people now use the recordable media to easily and cost-effectively record large-volume digital data, such as image data and music data. Accompanying the popularity of such optical recording media, there is a growing demand for recording media that allow the users to print objects onto the surfaces opposite to the light-incident surfaces (hereinafter, simply referred to as the "label surface") using printers so as to produce originally designed optical recording media. Optical recording media of this type have already been developed and have been commercially available.

These optical recording media have "ink-receiving layers" on the label surfaces to affix ink. Printing on the label surface is conducted by applying ink on the ink-receiving layers using inkjet printers.

In general, the print quality is lower on the optical recording media than on glossy paper. Thus, although inkjet printers have the ability to product high-quality prints, such an ability has not been fully applied to the optical recording media. To overcome this problem, Japanese Unexamined Patent Application Publication No. 2002-237103 provides an optical recording medium comprising an ink-receiving layer having a surface roughness limited to a predetermined value or lower.

In order to reduce the surface roughness of the ink-receiving layer, the ink-receiving layer is preferably formed by spin coating. In such a case, the surface roughness of the ink-receiving layer is affected by the underlying layer. Consequently, even when a coating solution capable of forming a flat, smooth surface is selected, the surface roughness of the resulting ink-receiving layer is not necessarily small, and high print quality is not necessarily achieved.

As is apparent from the above, decreasing the surface roughness of the ink-receiving layer prepared by spin coating has not been easy.

Furthermore, Japanese Unexamined Patent Application Publication No. 9-288847 discloses a DVD-type optical recording medium having a colored supporting substrate (sometimes referred to as a "dummy substrate").

DISCLOSURE OF INVENTION

An object of the present invention is to reliably decrease the surface roughness of the ink-receiving layer to thereby provide an optical recording medium on which high-quality printing is possible, and to a method for making the optical recording medium.

In order to decrease the surface roughness of the ink-receiving layer, it is effective that the underlying layer have sufficiently high surface quality. Based on the extensive research conducted by the present inventors from this standpoint, it was found that the surface roughness of the ink-receiving layer can be notably decreased by disposing a colored "supporting substrate (dummy substrate)", which is generally used in DVD-type optical recording media, under the ink-receiving layer. However, whereas a supporting substrate is usually bonded to a light-transmissive substrate by UV irradiation after superimposing the light-transmissive substrate on the supporting substrate with a radically polymerizable UV-curable resin therebetween, such a standard-process cannot be employed if the supporting substrate is colored.

The present invention has been made to overcome this new technical problem. The optical recording medium of the present invention includes a light-transmissive substrate; a supporting substrate having a brightness of 8 or more and a saturation of 4 or less; a bonding layer for bonding the light-transmissive substrate to the supporting substrate; and a transparent ink-receiving layer formed on the surface of the supporting substrate remote from the light-transmissive substrate. The bonding layer contains an epoxy resin.

A method for making the optical recording medium according to the present invention includes the steps of bonding a light-transmissive substrate to a supporting substrate having a brightness of B or more and a saturation of 4 or less via a bonding layer composed of an epoxy resin; and forming a transparent ink-receiving layer on the surface of the supporting substrate remote from the light-transmissive substrate.

Here, the word "transparent" is used to mean that the ink-receiving layer is transparent such that the supporting substrate is visually recognizable through the ink-receiving layer. The phrase "bonding a light-transmissive substrate to a supporting substrate" means that the light-transmissive substrate is bonded on the supporting substrate either directly or via an interlayer, such as a functional layer, i.e., that the light-transmissive substrate is mechanically fixed onto the supporting substrate.

In this invention, the bonding layer is composed of a material containing an epoxy resin instead of a radically polymerizable UV-curable resin typically used. Thus, although UV irradiation through the supporting substrate is not possible, the light-transmissive substrate can be securely bonded to the supporting substrate.

In this invention, the supporting substrate having a brightness of 8 or more and a saturation of 4 or less is either white or in a bright color close to white. Thus, there is no need to dispose a colored layer, such as one containing white ink, between the ink-receiving layer and the supporting substrate, thereby simplifying the production process. Since the surface quality of the supporting substrate is directly reflected in the ink-receiving layer, the average surface roughness (Ra) of the ink-receiving layer can be minimized by making the supporting substrate by, for example, injection molding. In this manner, when objects are printed on the surface using an inkjet printer, color development and luster comparable to images shot by film cameras can be obtained.

Examples of colors having a brightness of 8 or more and a saturation of 4 or less include white (hue: N, brightness: 9.5, saturation: 0 (in terms of Munsell values, hereinafter the same); snow white (hue: N, brightness: 9.5, saturation: 0), baby pink (hue: 4R, brightness: 8.5, saturation: 4.0), shell pink (hue: 10R, brightness: 8.5, saturation: 3.5), nail pink (hue: 10R, brightness: 8.0, saturation: 4.0), peach (hue: 3YR, brightness: 8.0, saturation: 3.5), ecru beige (hue: 7.5YR, brightness: 8.5, saturation: 4.0), leghorn (hue: 2.5Y, brightness: 8.0, saturation: 4.0), cream yellow (hue: 5Y, brightness: 8.5, saturation: 3.5); ivory (hue: 2.5Y, brightness: 8.5, saturation: 1.5), cool white (hue: 10 PB, brightness: 9.5, saturation: 0.5), and cherry blossom (hue: 10RP, brightness: 9.0, saturation: 2.5). In this invention, the supporting substrate preferably has a brightness of 9 or more and a saturation of 3 or less. When the supporting substrate has a brightness of 9 or more and a saturation of 3 or less, printing quality can be further improved. Examples of colors having a brightness of 9 or more and a saturation of 3 or less include white (hue: N, brightness: 9.5, saturation: 0), snow white (hue: N, brightness: 9.5, saturation: 0), cool white (hue: 10PB, brightness: 9.5, saturation: 0.5), and cherry blossom (hue: 10RP, brightness: 9.0, saturation: 2.5).

In this invention, the supporting substrate more preferably has a brightness of 9.2 or more and a saturation of 0.5 or less. When the supporting substrate has a brightness of 9.2 or more and a saturation of 0.5 or less, printing quality can be further improved. Examples of colors having a brightness of a brightness of 9.2 or more and a saturation of 0.5 or less include white (hue: N, brightness: 9.5, saturation: 0), snow white (hue: N, brightness: 9.5, saturation: 0), and cool white (hue: 10Ps, brightness: 9.5, saturation: 0.5).

In the present invention, the average surface roughness (Ra) of the ink-receiving layer is preferably 0.1 $\mu$m less. The ink-receiving layer is preferably formed on the surface of the supporting substrate. The average surface roughness. (Ra) of the supporting substrate is preferably 0.1 $\mu$m or less. By forming the ink-receiving layer on the surface of the supporting substrate, the good surface quality of the supporting substrate, i.e., the surface quality exhibiting an average surface roughness (Ra) of 0.1 $\mu$m or less, can be reliably reflected in the ink-receiving layer.

In this invention, the epoxy resin may be cured by adding a cationic initiator. In this case, the epoxy resin is applied to at least one of the light-transmissive substrate and the supporting substrate, the epoxy, resin is irradiated with UV light, and the light-transmissive substrate is placed on the supporting substrate. Unlike radically polymerizable UV-curable resins, the epoxy resin containing the cationic initiator takes some time after the UV irradiation until the resin is completely cured. Thus it is sufficiently possible to superimpose the two substrates after the UV irradiation.

Alternatively, in this invention, the epoxy resin may be cured by an addition reaction with a crosslinking agent containing an active hydrogen compound. In such a case, the epoxy resin may be applied to one of the light-transmissive substrate and the supporting substrate, and the crosslinking agent containing the active hydrogen compound may be applied to the other one of the light-transmissive substrate and the supporting substrate before placing the light-transmissive substrate on the supporting substrate. In this manner, the light-transmissive substrate can be bonded to the supporting substrate without using UV light.

Alternatively, in this invention, the epoxy resin may be a thermosetting epoxy resin so that the epoxy resin can be cured by heating. In such a case, the thermosetting epoxy resin is applied to at least one of the light-transmissive substrate and the supporting substrate, and then the light-transmissive substrate is placed on the supporting substrate, followed by curing the epoxy resin by heating. In this case also, the light-transmissive substrate can be bonded to the supporting substrate without using UV light.

It should be noted that the step of forming the ink-receiving layer may be performed before the bonding step.

The optical recording medium of the present invention preferably has a recording layer disposed between the light-transmissive substrate and the bonding layer. Such an optical recording medium allows the user to record data thereon; thus, the advantage of the present invention, i.e., high-quality printing on the label surface, can be fully provided with this type of optical recording medium. The recording layer here may contain an organic dye or inorganic material to form record-once optical recording media, or may contain a phase change material to form a rewritable optical recording media.

As is described above, in the present invention, the bonding layer that bonds the light-transmissive substrate to the supporting substrate is composed of a material containing an epoxy resin instead of radically polymerizable UV-curable resin generally employed. Thus, the light-transmissive substrate can be tightly fixed onto the supporting substrate without UV irradiation through the supporting substrate.

Furthermore, the supporting substrate is white or in a bright color close to white. Thus, no colored layer, such as one containing white ink, is necessary between the ink-receiving layer and the supporting substrate, thereby simplifying the production process. The average surface roughness (Ra) of the ink-receiving layer can be notably minimized. Thus, color development and luster comparable to images shot by film cameras can be obtained by using inkjet printers.

BRIEF DESCRIPTION OF THE DRAWINGS

FIG. 10 is a flowchart showing a method for making the optical recording medium according to yet another embodiment of the present invention.

FIG. 11 is a flowchart showing a modification of the 0.10 method shown in FIG. 10.

BEST MODE FOR CARRYING OUT THE INVENTION

The preferred embodiments of the present invention will now be described in detail with reference to the attached drawings.

Figure 1:
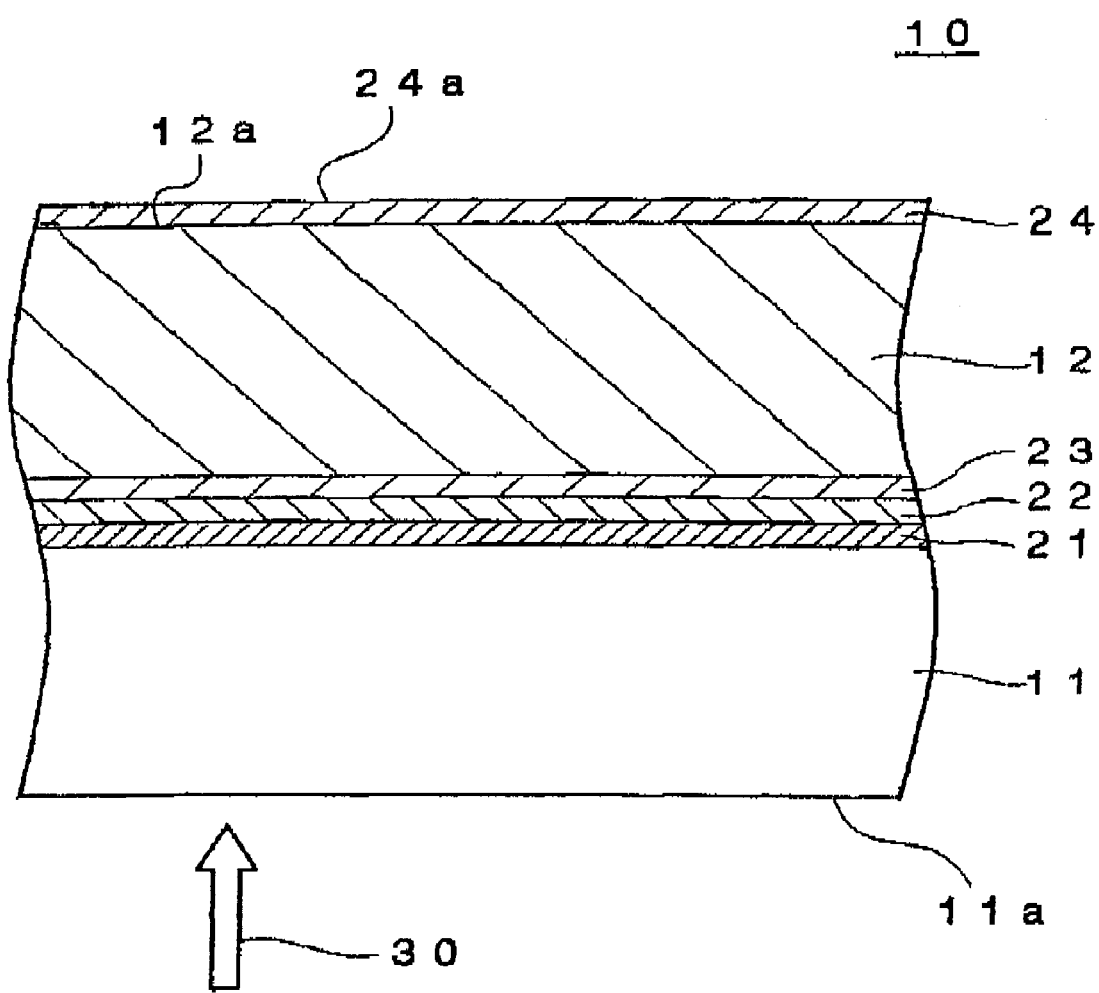
FIG. 1 is a cross-sectional view schematically showing the structure of an optical recording medium according to a preferred embodiment of the present invention.

FIG. 1 is a schematic cross-sectional view showing the structure of an optical recording medium according to a preferred embodiment of the present invention.

An optical recording medium 10 of this embodiment is disk-shaped and has a diameter of about 120 mm and a thickness of about 1.2 mm. As show in FIG. 1, the optical recording medium 10 includes a light-transmissive substrate 11, a supporting substrate 12; a functional layer 21, a protective layer 22, and a bonding layer 23 between the light-transmissive substrate 11 and the supporting substrate 12; and an ink-receiving layer 24 disposed on the surface of the supporting substrate 12. The supporting substrate 12 is sometimes referred to as a "dummy substrate".

Data can be read and/or written by irradiating a light-incident surface 11a with a laser beam 30 while rotating the optical recording medium 10. The wavelength of the laser beam 30 is about 650 nm, although the wavelength is not limited thereto. The numerical aperture of an objective lens for condensing the laser beam 30 is set to about 0.65.

The light-transmissive substrate 11 is a disk-shaped substrate composed of a material having a sufficiently high light-transmittance in the wave range of the laser beam 30. The light-transmissive substrate 11 has the light-incident surface 11a on which the laser beam 30 is incident. The light-transmissive substrate 11 functions as an optical path for the laser beam 30 emitted while data are read and/or written. The light-transmissive substrate 11 also functions as a reinforcing substrate for providing a required mechanical strength to the optical recording medium 10. The thickness of the light-transmissive substrate 11 is set to about 0.6 mm, although the thickness is not limited thereto. The light-transmissive substrate 11 is preferably composed of a resin so that it can easily be processed into a desired shape. Examples of the resin of the light-transmissive substrate 11 include polycarbonate resins, olefin resins, acrylic resins, epoxy resins, polystyrene resins, polyethylene resins, polypropylene resins, silicone resins, fluorocarbon resins, ABS resins, and urethane resins. It is preferable to use polycarbonate resins or olefin resins since either one has good optical characteristics and processability.

The supporting substrate 12 not only reinforces the optical recording medium 10 to have sufficient mechanical strength but also contributes to obtaining the thickness (for example, about 1.2 mm) required for the optical recording medium 10. The ink-receiving layer 24 is disposed on a surface 12a of the supporting substrate 12. The thickness of the ink-receiving layer 24 is not particularly limited but, for example, is set to about 0.6 mm, i.e., as thick as the light-transmissive substrate 11. In this embodiment, the supporting substrate 12 is composed of a resin selected from those described above as the preferable materials for forming the light-transmissive substrate 11. The supporting substrate 12 is colored white by the addition of a white pigment (hue: N, brightness: 9.5, saturation: 0). Preferable examples of the white pigment include titanium oxide, zinc oxide, aluminum oxide, aluminum hydroxide, lead white (basic lead carbonate), strontium titanate, calcium carbonate, mica, barium sulfate, silica, talc, kaolin clay, pyrophyllite clay, and zeolite. Among these, titanium oxide, which has a high reflectance and can develop color in small amounts, is particularly preferable. When titanium oxide is used as the white pigment, the content thereof is preferably about 5 to 15 percent by weight. Other pigments, organic pigments, and dyes may be used in combination to adjust the hue of the white.

The supporting substrate 12 is also the underlying layer of the ink-receiving layer 24. Since the supporting substrate 12 is colored white as described above, the print quality on the ink-receiving layer 24 can be notably improved. The average surface roughness (Ra) of the surface 1a of the supporting substrate 12 is preferably as small as possible, in particular 0.1 μm or less. A surface roughness of 0.1 μm or lower can easily be achieved by preparing the supporting substrate 12 by extrusion molding.

Figure 2:
FIG. 2 is a partial cross-sectional view showing the structure of a functional layer in a ROM disc.
Figure 3:
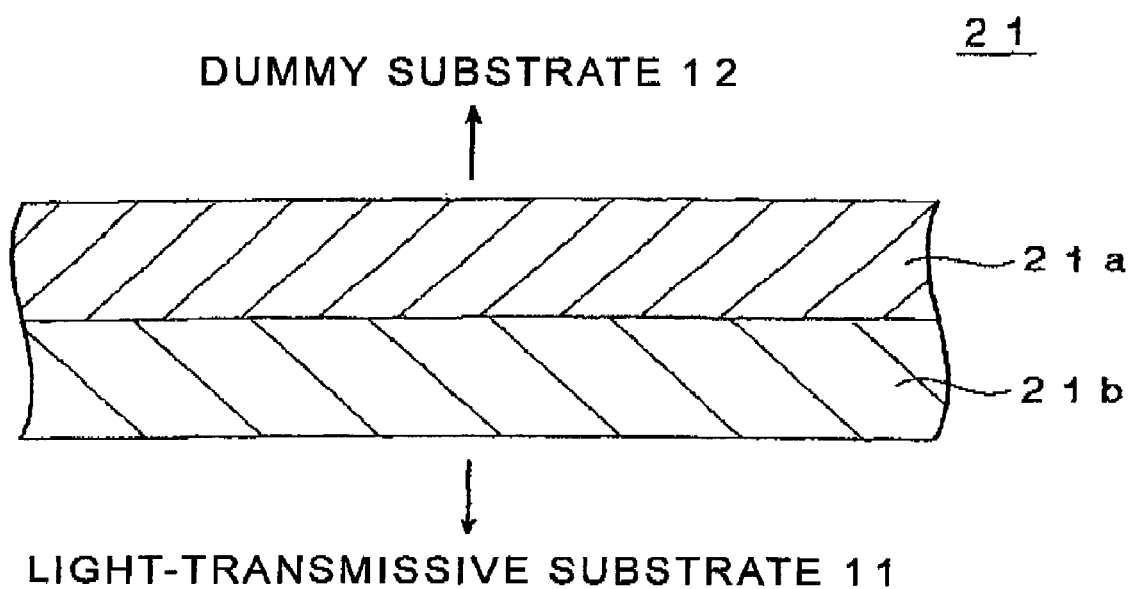
FIG. 3 is a partial cross-sectional view showing the structure of a functional layer in a write-once disc.
Figure 4:
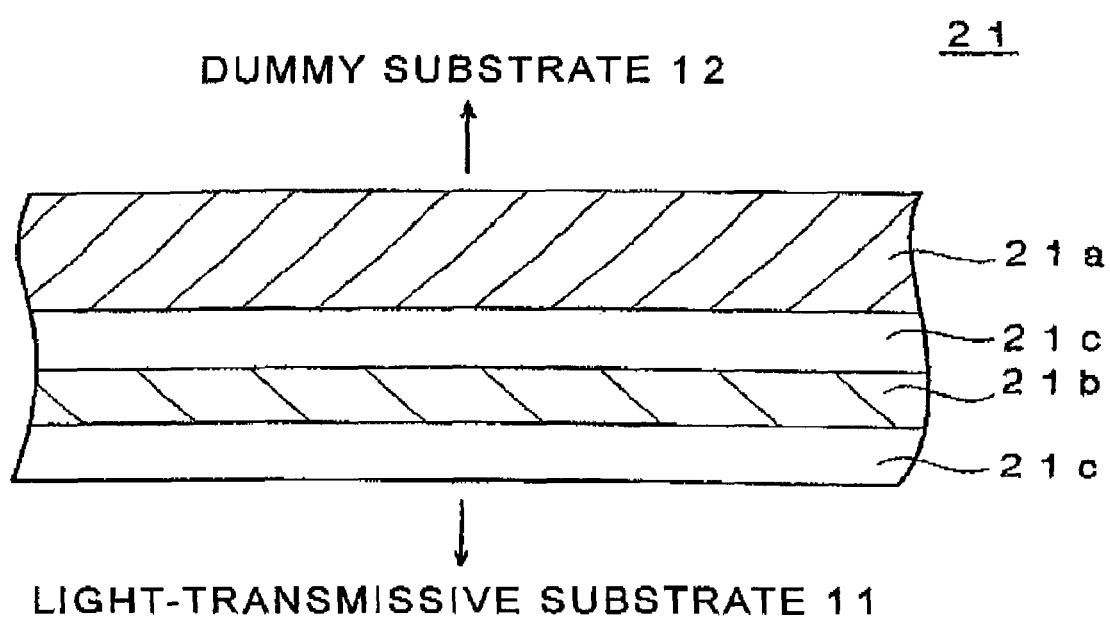
FIG. 4 is a partial cross-sectional view showing the structure of a functional layer in a rewritable disc.

The structure and the material of the functional layer 21 depend on the type of the disk. In ROM disks, such as DVD-ROMs, the functional layer 21 is usually a reflective layer 21a containing a metal, as shown in FIG. 2. In write-once discs, such as DVD-Rs, the functional layer 21 is usually a combination of a recording layer 21b containing an organic dye and a reflective layer 21a containing a metal disposed on the recording layer 21b, as shown in FIG. 3. In rewritable-disks, such as DVD-RWs, the functional layer 21 is usually a combination of a recording layer 21b containing a phase change material, dielectric layers 21c sandwiching the recording layer 21b, and a reflective layer-21a containing a metal, as shown in FIG. 4. Since the present invention is directed to optical recording media having label surfaces that allow printing, the present invention is preferably applied to write-once disks (FIG. 3) and rewritable disks (FIG. 4).

The protective layer 22 protects the functional layer 21 disposed on the light-transmissive substrate 11. The thickness and the material of the protective layer 22 are not particularly limited, as long as the functional layer 21 can be physically and chemically protected. Preferable examples of the material include acrylic and epoxy UV-curable resins. The thickness is, for example, in the range of about 0.5 μm to about 100 μm.

The bonding layer 23 bonds the supporting substrate 12 to a laminate constituted from the light-transmissive substrate 11, the functional layer 21, and the protective layer 22. In this embodiment, the bonding layer 23 is composed of an epoxy resin. This is because the supporting substrate 12 is colored white and thus a standard method cannot be employed, i.e., a method in which the light-transmissive substrate 11 and the supporting substrate 12 superimposed on each other are bonded by UV irradiation through the supporting substrate 12 using a bonding layer 23 composed of radically polymerizable UV-curable resin. The detailed explanation will be provided below. Examples' of the bonding method using epoxy resins include a method of curing the resin using a cationic initiator, a method of curing the resin by an addition reaction with a crosslinking agent containing an active hydrogen compound, and a method for curing the resin by heating.

The ink-receiving layer 24 is the outermost layer remote from the light-incident surface 11a. The ink-receiving layer 24 affixes the ink provided by an inkjet printer. In this invention, the supporting substrate 12 must be visually recognizable through the ink-receiving layer 24; thus, the ink-receiving layer 24 is transparent. Here, the word "transparent" is used to mean that the layer beneath the ink-receiving layer 24 is visually recognizable through the ink-receiving layer 24. The smaller the average surface roughness (Ra) of a surface 24a of the ink-receiving layer 24, the better the printing quality, in particular, the more improved the color development and the luster, when objects are printed using a printer. In order to achieve color development and luster comparable to images shot by film cameras, i.e., photographic image quality, the average surface roughness (Ra) of the surface 24a of the ink-receiving layer 24 is preferably 0.1 μm or less. The thickness of the ink-receiving layer 24 is not particularly limited but is preferably in the range of 10 μm to 30 μm. The ink-receiving layer 24 is preferably composed of a hydrophilic resin, such as polyvinyl alcohol or polyvinyl acetal, as the major component, a cationic polymer that functions as an ink-fixing agent, and other additives.

As is described above, in the optical recording medium 10 of the present invention, since the supporting substrate 12 colored white is disposed under the ink-receiving layer 24, the average surface roughness (Ra) of the surface 24a of the ink-receiving layer 24 is significantly small. Thus, when objects are printed on this surface using an inkjet printer, it is possible to obtain color development and luster comparable to images shot by film cameras.

Moreover, in the present invention, the bonding layer 23 is composed of an epoxy resin instead of a radically polymerizable UV-curable resin. Thus, it is possible to reliably bond the light-transmissive substrate 11 to the supporting substrate 12 without conducting UV irradiation through the supporting substrate 12.

A method for making the optical recording medium 10 according to an embodiment of the present invention will now be described.

Figure 5:
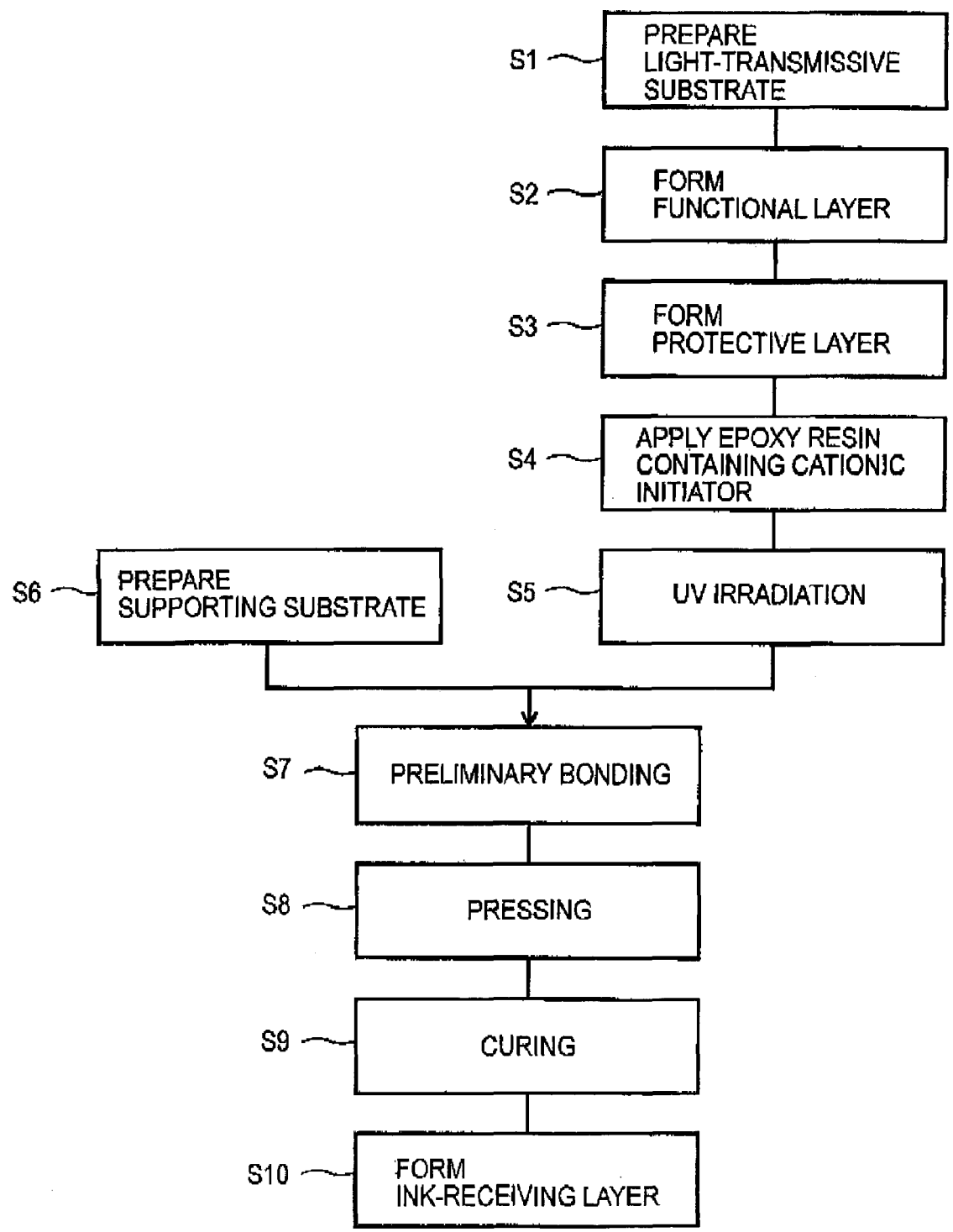
FIG. 5 is a flowchart showing a method for making the optical recording medium according to a preferred embodiment of the present invention.

FIG. 5 is a flowchart for explaining the method for making the optical recording medium 10 according to this embodiment.

The light-transmissive substrate 11 is prepared by mold injection (step S1). If the optical recording medium 10 to be produced is of a ROM-disc type, a stamper carrying a reversal pattern of signal pits is used. If the optical recording medium 10 to be produced is of a write-once type or a rewritable type, a stamper carrying a reversal pattern of spiral or concentric grooves is used. In this manner, signal pits or grooves for guiding a laser beam are produced on one surface of the light-transmissive substrate 11 by stamping. The other surface of the light-transmissive substrate 11 functions as the light-incident surface 11a shown in FIG. 1.

In step S2, the functional layer 21 is formed on the surface of the light-transmissive substrate 11 having pits or grooves. The structure and the material of the functional layer 21 differ depending on the type of disk, as described above. For example, if the optical recording medium 10 to be produced is of a ROM-disc type, the reflective layer 21a shown in FIG. 2 is prepared by sputter-despositing an alloy primarily containing silver (Ag). If the optical recording medium 10 to be produced is of a write-once type, the recording layer 21b shown in FIG. 3 is formed by applying a coating solution containing an organic pigment by spin coating, and then the reflective layer 21a shown in FIG. 3 is formed by sputter-depositing an alloy primarily containing silver (Ag). If the optical recording medium 10 to be produced is of a rewritable type, a mixture of ZnS and $SiO_2$, a phase change material such as a SbTe-based material, and the mixture of ZnS and $SiO_2$ are sequentially sputter-deposited to form the dielectric layer 21c, the recording layer 21b, and the dielectric layer 21c shown in FIG. 4. Subsequently, the reflective layer 21a is formed by sputter-depositing an alloy primarily containing silver (Ag) shown in FIG. 4.

In step S3, the protective layer 22 is formed on the surface of the functional layer 21. The protective layer 22 is preferably formed by applying an acrylic or epoxy UV-curable resin by spin-coating and then curing the applied resin by UV irradiation.

In step S4, an uncured epoxy resin containing a cationic initiator is applied on the surface of the protective layer 22. Preferably, a spin-coating method is employed to apply the resin. The epoxy resin containing the cationic initiator is subjected to UV irradiation (step S5), and before the resin is completely cured, the supporting substrate 12 separately prepared in advance by mold injection (step S6) is superimposed (preliminary bonding, step S7). The preliminary bonding is preferably conducted under a reduced pressure. Unlike a radically polymerizable UV-curable resin, the epoxy resin containing the cationic initiator takes some time after the UV irradiation until the resin is completely cured. Thus, it is possible to superimpose the substrate after the UV irradiation, as is described in this embodiment. Moreover, the time taken for curing the resin can be controlled by adjusting the amount of the cationic initiator added thereto, for example.

The above-described steps are employed in this embodiment because the supporting substrate 12 is colored white due to the addition of the white pigment. Once the supporting substrate 12 is superimposed, it is not possible to apply UV-light through the supporting substrate 12. It is also difficult to apply UV light through the light-transmissive substrate 11, since the reflective layer 21a is disposed on the light-transmissive substrate 11.

After the preliminary bonding, the light-transmissive substrate 11 and the supporting substrate 12 are pressed (step S8), and left to stand for a while, e.g., about one day (step S9) to tightly bond the two substrates.

In step S10, the ink-receiving layer 24 is formed on the surface 12a of the supporting substrate 12 to complete the production of the optical recording medium 10 shown in FIG. 1. The ink-receiving layer 24 is preferably formed by spin-coating or slit-coating. Spin-coating is a well-known method in which a coating solution (a liquid prepared by diluting the material of the ink-receiving layer 24 with water or a solvent other than water) is dropped at the center or the near the center of the surface (12a) of a workpiece (supporting substrate 12) and the workpiece is rotated to spread the coating solution toward the periphery by centrifugal force. Slit-coating is a method in which a coating solution is supplied from a slit formed in a head and the relative position between the head and the workpiece is changed to spread the coating solution over the surface of the workpiece.

The ink-receiving layer 24 is preferably formed by the spin-coating or slit-coating method because the average surface roughness (Ra) of the surface 24a can be reduced by either method. Although the thickness distribution of the ink-receiving layer 24 tends to be slightly larger when the spin-coating or slit-coating method is employed than when screen-printing is employed, such a thickness distribution rarely affects the printing quality when the ink-receiving layer 24 is transparent or translucent.

The ink-receiving layer 24 formed by spin-coating or slit-coating is directly affected by the surface quality of the underlying layer, unlike when the ink-receiving layer 24 is formed by screen-printing. In particular, the average surface roughness (Ra) of the underlying layer is substantially directly reflected in the average surface roughness (Ra) of the surface 24a of the ink-receiving layer 24. In this embodiment, the supporting substrate 12, which can be prepared by injection molding, is the underlying layer of the ink-receiving layer 24. Since the average surface roughness (Ra) of the surface 12a of the supporting substrate 12 can be easily reduced to 0.1 µm or less, it is possible to reduce the average surface roughness (Ra) of the surface 24a of the ink-receiving layer 24 to 0.1 µm or less.

As described above, the supporting substrate 12 of the optical recording medium 10 shown in FIG. 1 is colored white, and UV irradiation through the supporting substrate 12 is not possible after the supporting substrate 12 is superimposed. This problem can be overcome by using the epoxy resin containing the cationic initiator in the bonding layer 23 and by preliminarily bonding two substrates after the UV irradiation.

Figure 6:
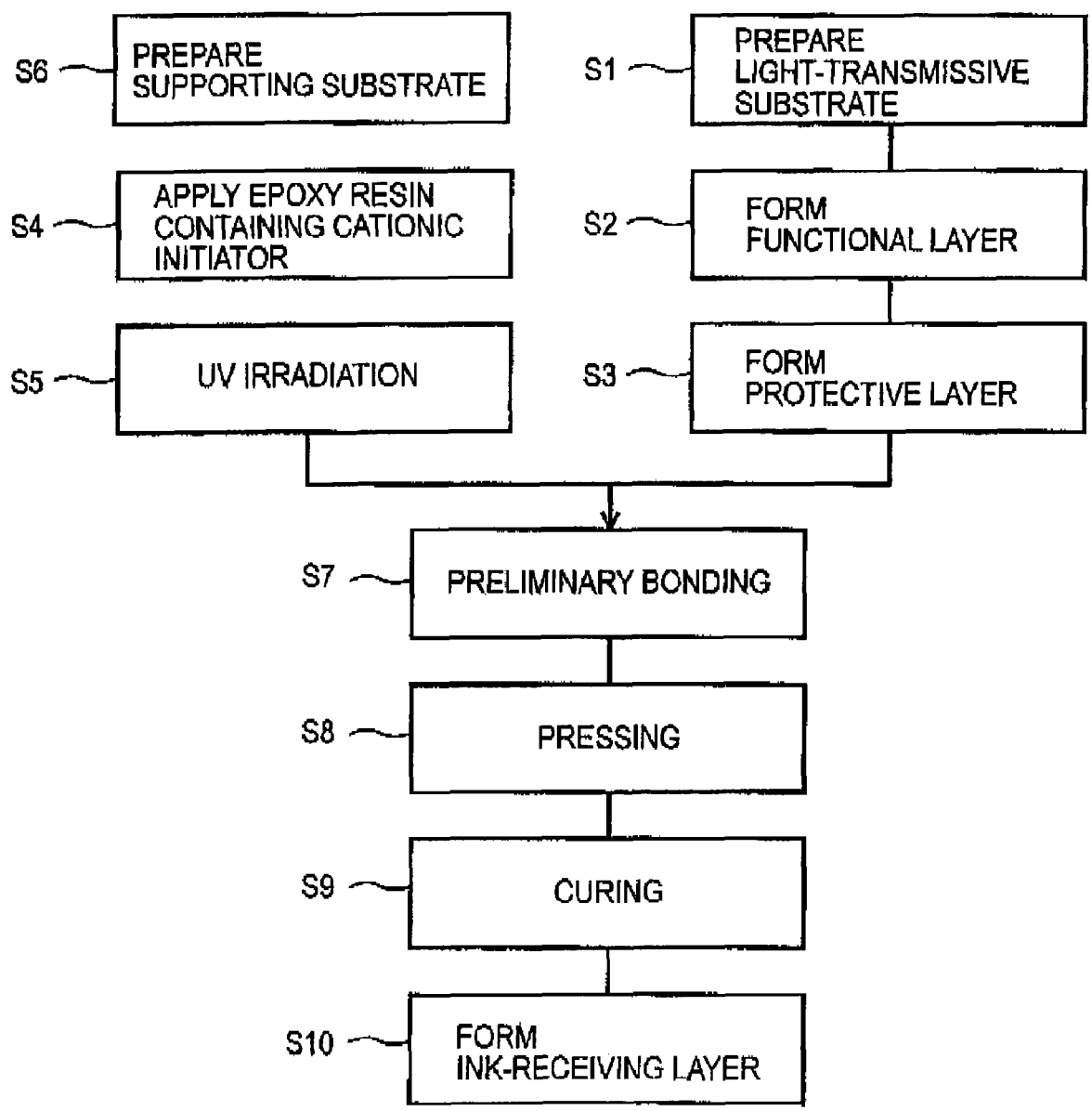
FIG. 6 is a flowchart showing a modification of the method shown in FIG. 5.

In the method described above, the epoxy resin containing the cationic initiator is applied on the light-transmissive substrate 11. Alternatively, as shown in the flowchart of FIG. 6, the epoxy resin containing the cationic initiator may be applied to the supporting substrate 12. In the flowchart of FIG. 6, the same steps as in FIG. 5 are represented by the same reference symbols. The same optical recording medium 10 can be prepared by this method as that prepared by the method indicated by the flowchart in FIG. 5.

Figure 7:
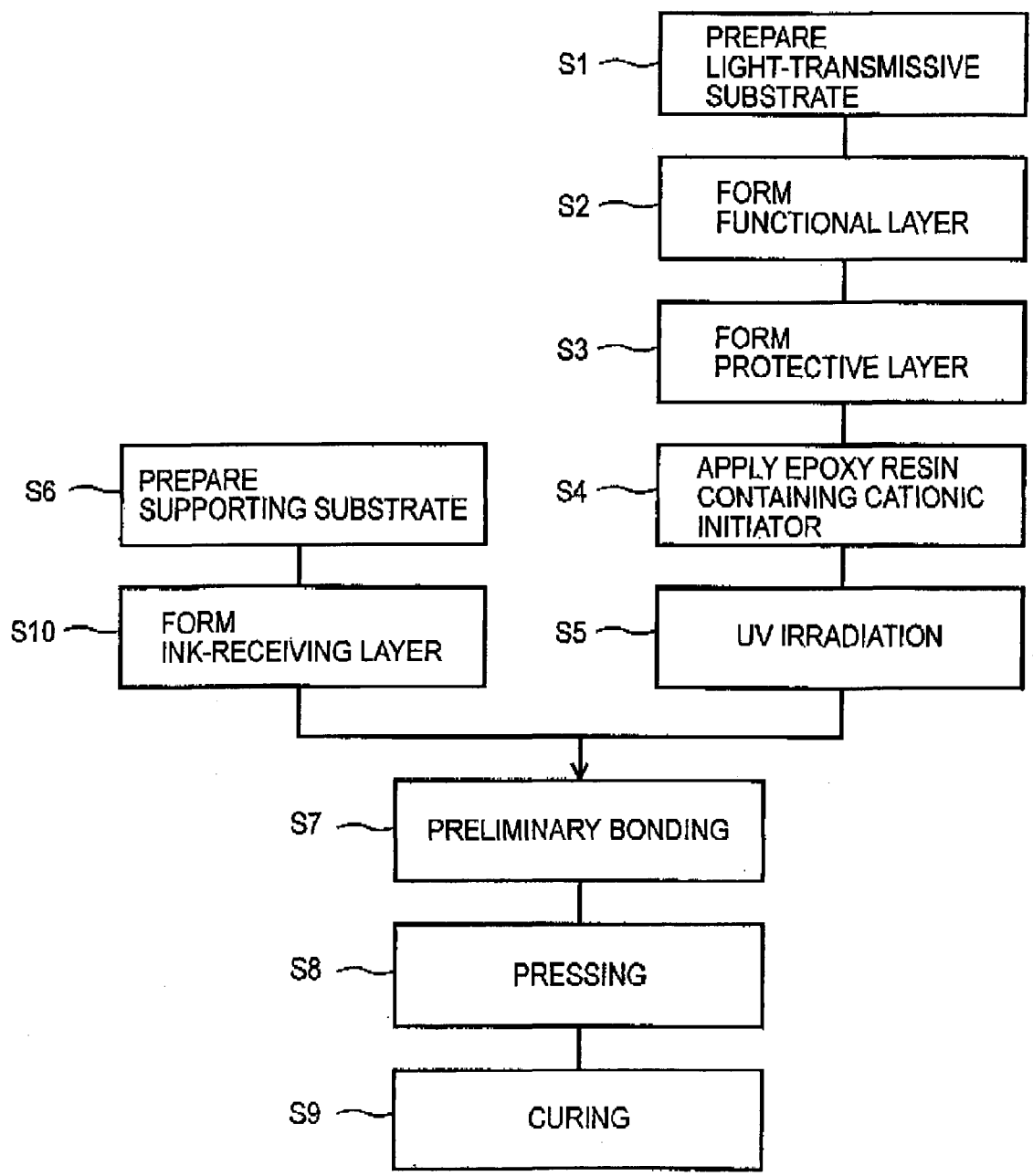
FIG. 7 is a flowchart showing another modification of the method shown in FIG. 5.

In the above-described method, the ink-receiving layer 24 is formed after the light-transmissive substrate 11 is superimposed on the supporting substrate 12. Alternatively, as shown in the flowchart in FIG. 7, the ink-receiving layer 24 may be formed prior to the preliminary bonding. In the flowchart of FIG. 7 also, the same steps as in FIG. 5 are represented by the same reference symbols. Alternatively, although not shown in the drawing, the epoxy resin containing the cationic initiator may be applied on the supporting substrate 12 (refer to FIG. 6).

Another preferable method for making the optical recording medium 10 according to the present invention will now be described.

Figure 8:
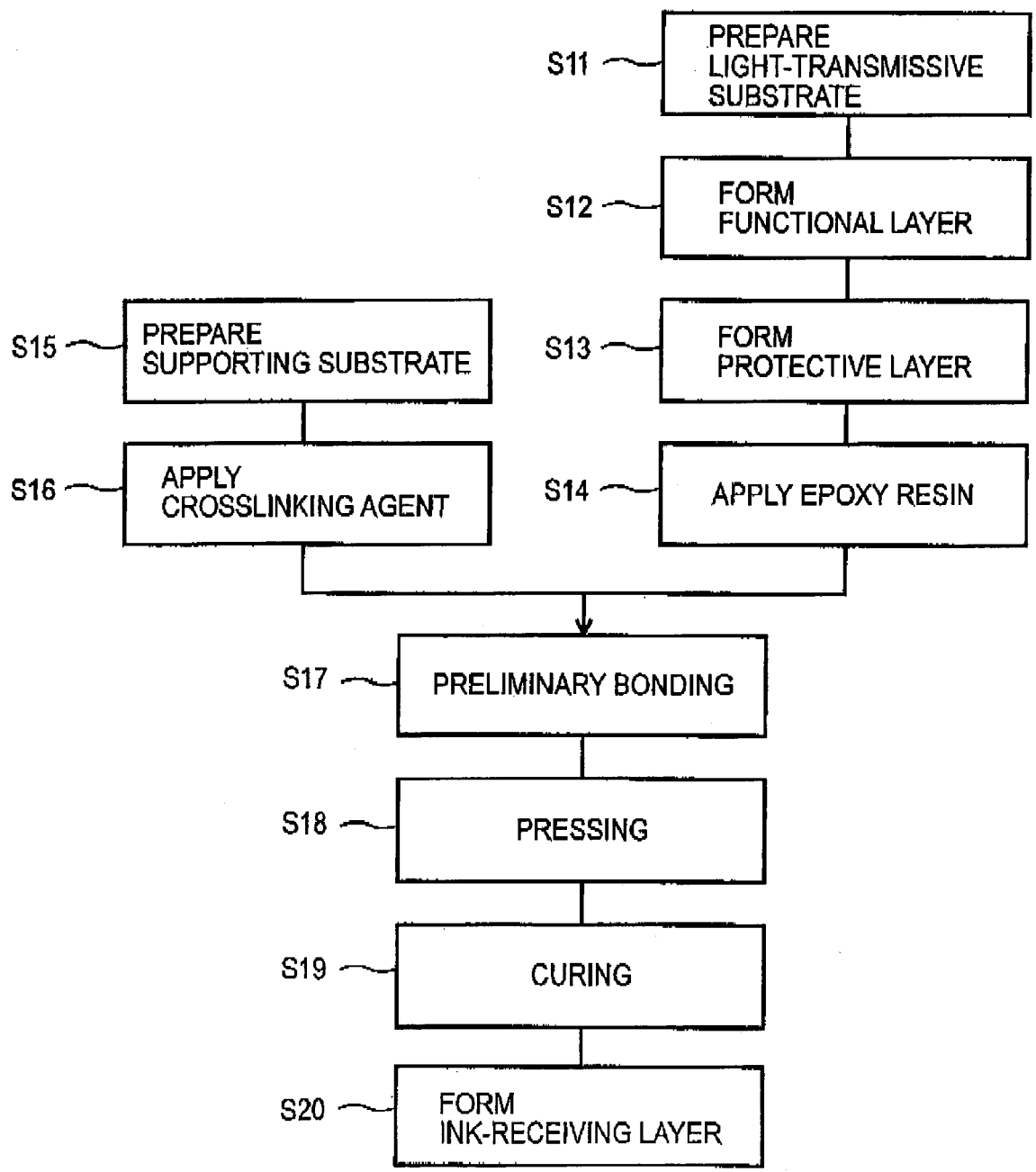
FIG. 8 is a flowchart showing a method for making the optical recording medium according to another preferred embodiment of the present invention.

FIG. 8 is a flowchart for explaining the method for making the optical recording medium 10 according to this embodiment.

In step S11, the light-transmissive substrate 11 is formed by injection molding. In step S12, the functional layer 21 is formed on the surface of the light-transmissive substrate 11 having pits or grooves. In step S13, the protective layer 22 is formed on the functional layer 21. These steps are the same as steps S1 to S3 shown in FIG. 5. In step S14, an uncured epoxy resin containing a cationic initiator is applied on the surface of the protective layer 22.

In step S15, the supporting substrate 12 is separately prepared by injection molding, and, in step S16, a crosslinking agent containing an active hydrogen compound is applied on the surface of the supporting substrate 12. The light-transmissive substrate 11 is placed on the supporting substrate 12 (preliminary bonding) so that the uncured epoxy resin comes into contact with the crosslinking agent (step S17). In this process also, the preliminary bonding is preferably performed under a reduced pressure. By mixing the uncured epoxy resin and the crosslinking agent, the epoxy resin becomes cured.

After the preliminary bonding, the light-transmissive substrate 11 and the supporting substrate 12 are pressed (step S18), and left to stand for a while, e.g., for about one day (step S19), to tightly bond the two substrates. In step S20, the ink-receiving layer 24 is formed on the surface 12a of the supporting substrate 12 to prepare the optical recording medium 10 shown in FIG. 1.

As is described above, the epoxy resin is cured not by UV irradiation but by mixing the uncured epoxy resin with the crosslinking agent so as to bond the light-transmissive substrate 11 and the supporting substrate 12. This is because the supporting substrate 12 is colored white by the addition of the white pigment.

Figure 9:
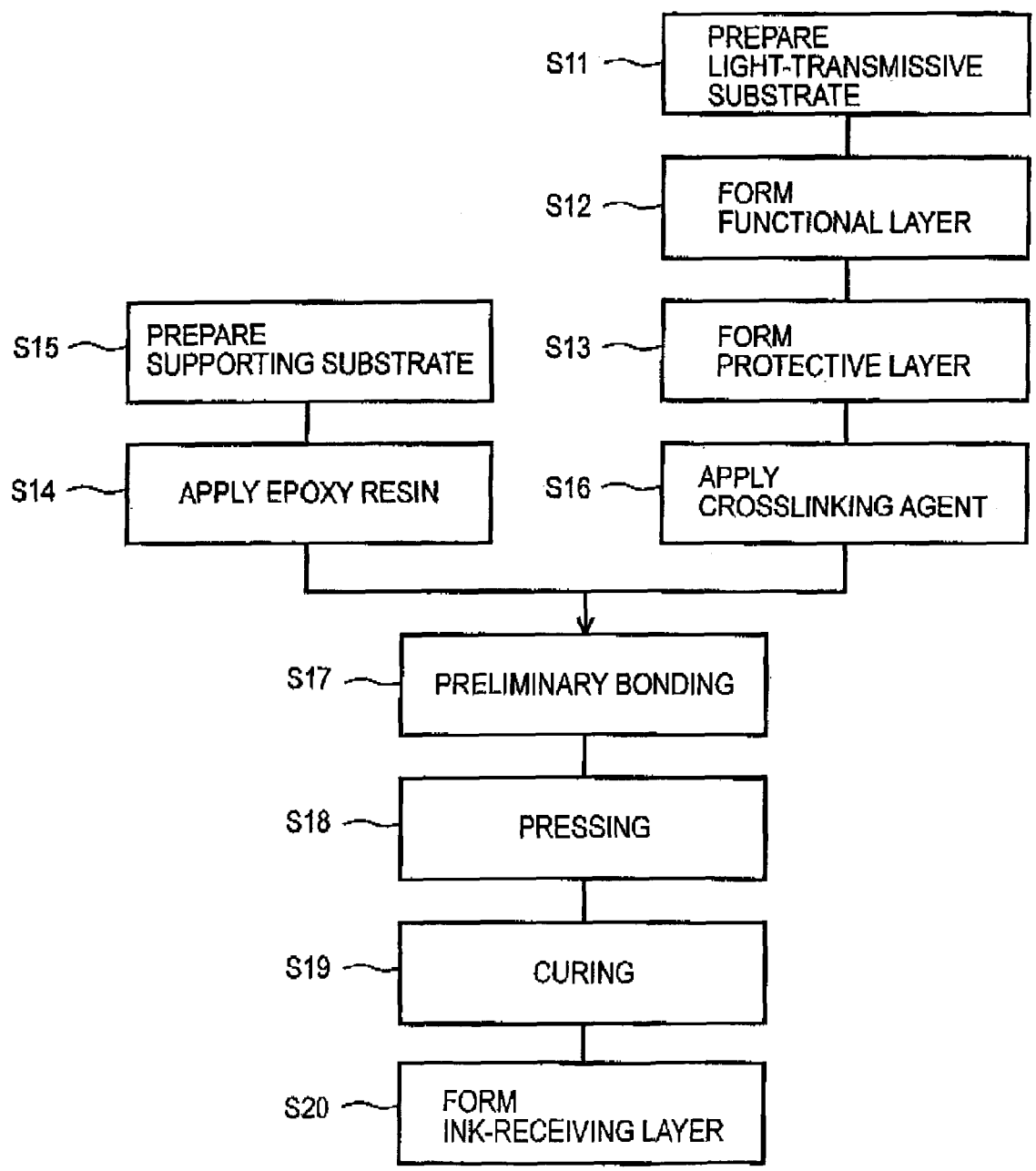
FIG. 9 is a flowchart showing a modification of the method shown in FIG. 8.

In the method described above, the uncured epoxy resin is applied on the light-transmissive substrate 11, and the crosslinking agent containing the active hydrogen compound is applied on the supporting substrate 12. Alternatively, as shown in the flowchart in FIG. 9, the crosslinking agent containing the active hydrogen compound may be applied on the light-transmissive substrate 11, and the uncured epoxy resin may be applied on the supporting substrate 12. In the flowchart shown in FIG. 9, the same steps as in FIG. 8 are represented by the same reference symbols. The same optical recording medium can be prepared by this method as that prepared by the method indicated by the flowchart in FIG. 8.

Although not shown in the drawing, the ink-receiving layer 24 may be formed prior to the preliminary bonding (step S17), as in the aforementioned embodiment.

Next, another preferable example of the method for making the optical recording medium 10 according to the present invention is described.

FIG. 10 is a flowchart for explaining the method for making the optical recording medium 10 according to this embodiment.

In step S21, the light-transmissive substrate 11 is prepared by injection molding. In step S22, the functional layer 21 is formed on the surface of the light-transmissive substrate 11 having pits or grooves. In step S23, the protective layer 22 is formed on the surface of the functional layer 21. These steps are the same as steps S1 to S3 shown in FIG. 5. In step S24, a thermosetting epoxy resin is applied on the surface of the protective layer 22.

In step S25, the supporting substrate 12 is separately prepared by injection molding. In step S26, the supporting substrate 12 is placed on the light-transmissive substrate 11 with the thermosetting epoxy resin therebetween (preliminary bonding). In this method also, the preliminary bonding is preferably performed under a reduced pressure.

After the preliminary bonding, in step S27, the light-transmissive substrate 11 and the supporting substrate 12 are subjected to heat pressing and left to stand for a while, e.g., for about one day (step S28), to tightly bond the two substrates. The ink-receiving layer 24, is formed on the surface 12a of the supporting substrate 12 to prepare the optical recording medium 10 shown in FIG. 1 (step S29).

As is described above, the light-transmissive substrate 11 is bonded to the supporting substrate 12 by heat curing. This is also due to the fact that the supporting substrate 12 is colored white by the addition of the white pigment.

In the method described above, the thermosetting epoxy resin is applied on the light-transmissive substrate 11. Alternatively, as shown in the flowchart of FIG. 11, the thermosetting epoxy resin may be applied on the supporting substrate 12. In the flowchart shown in FIG. 11, the same steps as that in FIG. 10 are represented by the same reference symbols. The same optical recording medium can be made by this method as that made by the method indicated by the flowchart in FIG. 10.

Although not illustrated in the drawing, the ink-receiving layer 24 may be formed before the preliminary bonding (step S26), as in the aforementioned embodiments.

The present invention is not limited to the above-described embodiments. Various modifications are possible without departing from the scope of the claims of the invention and these modifications are naturally within the scope of the present invention.

For example, in each embodiment described above, the supporting substrate 12 is colored white by the addition of the white pigment to a transparent material, such as polycarbonate resin. Alternatively, the supporting substrate may be prepared by using a white material so that the supporting substrate has a brightness of 8 or more and saturation of 4 or less.

Although the ink-receiving layer 24 is directly formed on the surface of the supporting substrate 12 in the embodiments described above, an interlayer may be formed between the supporting substrate 12 and the ink-receiving layer 24 as long as the surface quality of the supporting substrate 12 is sufficiently reflected in the ink-receiving layer 24.

What is claimed is:

1. An optical recording medium comprising;
a light-transmissive substrate;
a supporting substrate having a brightness of 8 or more and a saturation of 4 or less;
a bonding layer for bonding the light-transmissive substrate to the supporting substrate; and
a transparent ink-receiving layer formed on the surface of the supporting substrate remote from the light-transmissive substrate,
wherein the bonding layer comprises an epoxy resin.

2. The optical recording medium according to claim 1, wherein the supporting substrate has a brightness of 9 or more and a saturation of 3 or less.

3. The optical recording medium according to claim 2, wherein the supporting substrate has a brightness of 9.2 or more and a saturation of 0.5 or less.

4. The optical recording medium according to claim 1, wherein the average surface roughness (Ra) of the ink-receiving layer is 0.1 µm or less.

5. The optical recording medium according to claim 2, wherein the average surface roughness (Ra) of the ink-receiving layer is 0.1 µm or less.

6. The optical recording medium according to claim 1, wherein the ink-receiving layer is formed on the surface of the supporting substrate.

7. The optical recording medium according to claim 4, wherein the ink-receiving layer is formed on the surface of the supporting substrate.

8. The optical recording medium according to claim 1, wherein the average surface roughness (Ra) of the supporting substrate is 0.1 µm or less.

9. The optical recording medium according to claim 4, wherein the average surface roughness (Ra) of the supporting substrate is 0.1 µm or less.

10. The optical recording medium according to claim 6, wherein the average surface roughness (Ra) of the supporting substrate is 0.1 µm or less.

11. The optical recording medium according to claim 7, wherein the average surface roughness (Ra) of the supporting substrate is 0.1 µm or less.

12. The optical recording medium according to claim 1, wherein the epoxy resin is cured using a cationic initiator.

13. The optical recording medium according to claim 1, wherein the epoxy resin is cured by an addition reaction between the epoxy resin and a crosslinking agent containing an active hydrogen compound.

14. The optical recording medium according to claim 1, wherein the epoxy resin is a thermosetting epoxy resin.

15. The optical recording medium according to claim 1, further comprising a recording layer disposed between the light-transmissive substrate and the bonding layer.

16. A method for making an optical recording medium, comprising the steps of:
bonding a light-transmissive substrate to a supporting substrate having a brightness of 8 or more and a saturation of 4 or less via a bonding layer comprising an epoxy resin; and
forming a transparent ink-receiving layer on a surface of the supporting substrate remote from the light-transmissive substrate.

17. The method for making the optical recording medium according to claim 16, wherein the step of bonding comprises a substep of applying an epoxy resin containing a cationic initiator onto at least one of the light-transmissive substrate and the supporting substrate and a substep of superimposing the light-transmissive substrate on the supporting substrate after irradiation of the epoxy resin with UV light.

18. The method for making the optical recording medium according to claim 16, wherein the step of bonding comprises a substep of applying the epoxy resin onto one of the light-transmissive substrate and the supporting substrate, a substep of applying a crosslinking agent containing an active hydrogen compound onto the other of the light-transmissive substrate and the supporting substrate, and a substep of superimposing the light-transmissive substrate on the supporting substrate.

19. The method for making the optical recording medium according to claim 16, wherein the step of bonding comprises a substep of applying a thermosetting epoxy resin onto at least one of the light-transmissive substrate and the supporting substrate and a substep of curing the epoxy resin by heating after the light-transmissive substrate is superimposed on the supporting substrate.

20. The method for making the optical recording medium according to claim 16, wherein the step of forming the ink-receiving layer is performed before the step of bonding.

* * * * *